May 9, 1961 F. E. BRETZ, JR Re. 24,981

VALVE MECHANISM FOR DISPENSING APPARATUS

Original Filed Sept. 26, 1955 2 Sheets-Sheet 1

Inventor
Frank E. Bretz, Jr.

Charles H. Redman Atty.

VALVE MECHANISM FOR DISPENSING APPARATUS

Original Filed Sept. 26, 1955 2 Sheets-Sheet 2

Inventor
Frank E. Bretz, Jr.

Charles H. Redman Atty.

United States Patent Office

Re. 24,981
Reissued May 9, 1961

24,981

VALVE MECHANISM FOR DISPENSING APPARATUS

Frank E. Bretz, Jr., Elmhurst, Ill., assignor, by mesne assignments, to Precision Valve Corporation, Yonkers, N.Y., a corporation of New York Original No. 2,906,461, dated Sept. 29, 1959, Ser. No. 536,343, Sept. 26, 1955. Application for reissue July 28, 1960, Ser. No. 54,555

17 Claims. (Cl. 239—123)

Matter enclosed in heavy brackets [ ] appears in the original patent but forms no part of this reissue specification; matter printed in italics indicates the additions made by reissue.

This invention relates to valve mechanisms and more particularly to an improved valve for dispensing, in spray or aerosol form, materials contained under pressure. The valve mechanism herein is of the type set forth in my co-pending application Serial No. 457,769, now Patent No. 2,801,029, filed September 22, 1954, of which this application is a continuation-in-part.

The valve of the present invention is a simplified modification of the valve of the parent application. Generally, the valve construction includes a spray tip or press button having a cleaning lug arranged to be actuated through and along certain flow orifices to clean out any foreign or other matter lodged therein. Also, a valve stem, which the press button removably embraces, is so shaped as to provide a longitudinally extending flow passageway between the stem and button. Adjacent surfaces of the button and stem, at and adjacent the end of the stem, are shaped to provide expansion chamber and bow passageways so arranged as to direct effluent streams of aerosol mixtures in a circular path to provide a thorough mixture of materials and a more finely divided ejection spray.

These features permit the use of viscous formulations which normally clog flow passageways required to be restricted in cross-section to effect a spray ejection.

An important object, then, of this invention is the provision of a dispensing valve mechanism which permits, with equal facility and uniform operation, the vaporization and atomization of various types of aerosol mixtures without being affected by the numerous different solids or chemicals involved.

Another object of the invention is the provision of a dispensing valve mechanism arranged to provide larger flow passageways during the filling operation of an applied container than are used during the dispensing operation.

Still another object of the invention is the provision in a dispensing valve mechanism of a system of flow orifices and passageways of such size and position relative to each other as to enhance the aerosol vaporization and atomization of a contained fluid during the ejection or discharge thereof from the container.

Another and further object of the invention is the provision of a dispensing valve mechanism having flow orifices directing effluent streams of aerosol mixtures in a circular path in an expansion chamber immediately before ejection into the atmosphere.

Another and still further object of this invention is to provide a dispensing valve mechanism adapted to be actuated to clean certain internal flow passageways and orifices and thereby maintain dispensing efficiency.

A still further object of the invention is the provision of a dispensing valve mechanism readily adapted for economical mass production without the use of soldering, welding, brazing or threading.

A still further object of the invention is the provision of a dispensing valve mechanism which is simple in construction and highly efficient in operation.

Other objects and advantages of the invention will become apparent from the following detailed description taken in connection with the accompanying drawing, in which.

Figure 1:
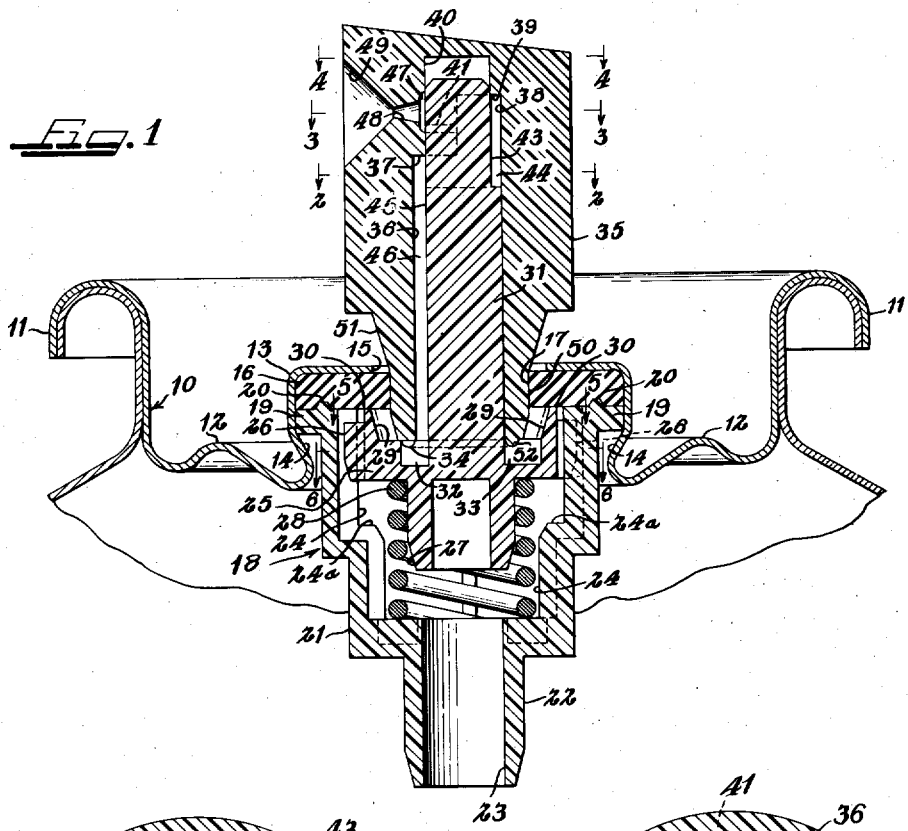
Figure 1 is a fragmental vertical cross-sectional view of the valve device of this invention shown as being mounted in a container.
Figure 2:
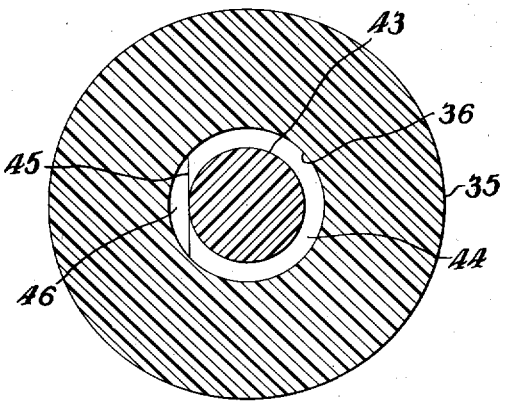
Figure 2 is a horizontal cross-sectional view taken along a plane indicated by the line 2—2 of Figure 1.
Figure 3:
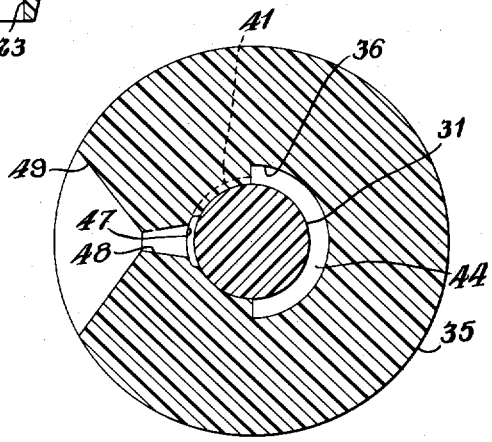
Figure 3 is a horizontal cross-sectional view taken along a plane indicated by the line 3—3 of Figure 1 and showing certain of the flow passageways at the ejection nozzle.
Figure 4:
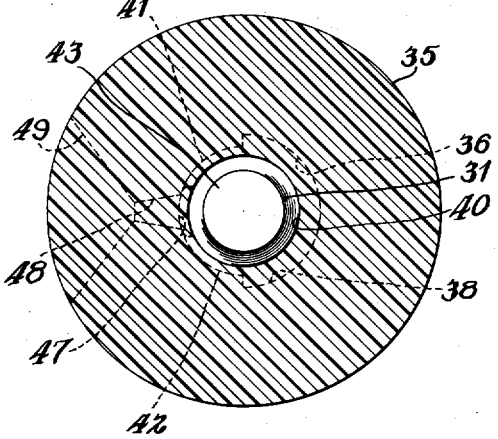
Figure 4 is a horizontal cross-sectional view taken along a plane indicated by the line 4—4 of Figure 1 and showing the flow passageways around the stem for directing streams of aerosol material against each other in an expansion chamber.

Referring now to Figure 1 of the drawings, the reference numeral 10 designates a cup-shaped mounting cap for a container designed for holding aerosol material under pressure. At its upper edge, the top wall of the container cap is formed into an outwardly and downwardly extending bead 11. The container proper (not shown) may be assembled to the container cap in any desired fashion. One arrangement could be the forming of a wall bead in the container to be complementally embraced in crimped engagement by the bead 11 of the cap. A central portion of the bottom 12 of the cap is shaped as an inverted cup 13 to provide an inwardly sloping shoulder 14 for a purpose to be described in detail later herein. A central opening 15 is provided in the top wall of the cup 13.

The container and mounting cap may be made of any suitable material which will withstand internal pressures exerted by the particular dispersant utilized as the propellant in the spray or aerosol composition to be contained. Usually, the material is metal.

A disc type gasket 16, formed of a suitable material such as natural or synthetic rubber, or the like, is seated within the inverted cup 13 against the top wall thereof. A central opening 17 in the gasket is smaller than and concentric with the opening 15 in the retaining cap. A valve housing 18, preferably of metal or non-resilient plastic, has an outwardly extending flange 19 sized to seat in the container cap against the gasket 16. The sloping shoulder 14, formed after the gasket and housing are assembled in the cap, provides a crimp for holding the assembly in place and serve to maintain the housing flange in pressure engagement with the gasket. The gasket 16 is thereby retained within and squeezed into tight peripheral sealing engagement with adjacent walls of the container cap. An annular rib or sealing ring 20, on the upper surface of the housing flange 19, is imnessed by pressure of the crimp into the disc gasket hereby effecting a face sealing of the assembled parts.

The valve housing 18 has a tubular body 21 depending from the flange and terminating at its lower end in tubular section 22 having a flow opening 23 therein. The tubular section is adapted to receive one end of a exible dip tube (not shown) designed to extend sufficiently into the container whereby contents are always jected through the valve from or near the bottom of he container.

Figure 6:
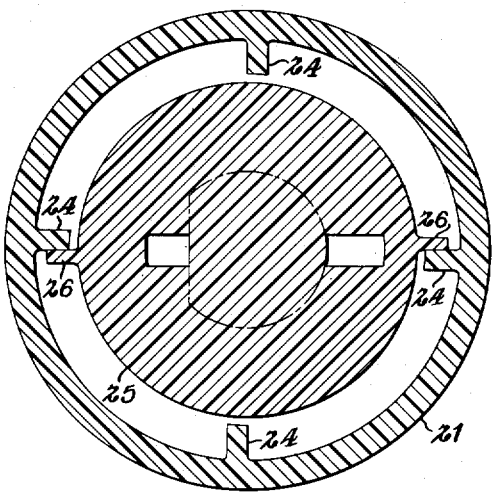
Figure 6 is a horizontal cross-sectional view taken along a plane indicated by the line 6—6 of Figure 1 and illustrating the operative connection of the valve element and valve housing to limit relative rotation therebetween.

As best shown in Figures 1 and 6, the tubular housing ody 21 has a plurality of circumferentially spaced inrior lugs or ribs 24, 24 extending along the bottom vall and vertically along the sidewall thereof. Each of he vertical ribs 24 is so shaped as to provide an internediate and inwardly extending offset seat 24a. This is or a purpose to be defined later herein.

A cup-shaped valve body 25 is sized to fit loosely within the valve housing 18 between the lugs 24, 24. A pair of oppositely extending abutment lugs 26, 26 are rovided on the valve body to engage opposite lugs 24, 4 to limit relative rotation of the valve body and the alve housing. Regardless of the position of the valve ody when inserted in the valve housing, the lugs limit elative rotation to approximately one-quarter turn.

A boss 27, on the lower side of the valve body, is mbraced by one end of a coiled spring 28 the other nd of which seats on the horizontal portions of the ribs 4, 24. The inside wall surface 29 of the cup-shaped alve body is sloped to provide a narrow seal rim 30. The coiled spring 28 normally urges the valve body into im engagement with the gasket 16 to seal the interiors f both the valve and the container. When the spring is ollapsed, the valve body is permitted to move to a osition seated on the offset seats 24a, 24a of the ribs 24.

Figure 5:
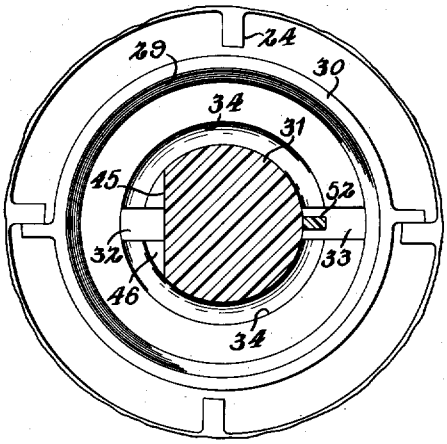
Figure 5 is a fragmental horizontal cross-sectional view, with parts in elevation, showing the operative connection of the valve element and press button in their abutting seated engagement.

As best shown in Figures 1 and 5, a valve stem 31 xtends from the cup portion of the valve body through he gasket 16 and the container cap opening 15. A aterally extending slot 32 is provided in the bottom f the cup portion of the valve body at the base of the alve stem 31. This slot terminates intermediately beween the stem and the sloped wall 29 of the valve body. Another slot 33 in the valve body, on the opposite ide of the stem, extends from the stem to the sloped vall 29. A groove 34, concentric with the vertical axis f the valve, extends around the stem with its outer edge angent to the outer end of the slot 32. The groove onnects with the slot 33 intermediate the ends.

A spray tip or press button 35 has an axial bore 36 xtending partially along its length *and functioning as a ocket* to receive therein the valve stem 31. The main ortion of the bore is of uniform diameter and terminates n one side of the valve axis in a shoulder 37. A porion 38 of the main bore, on the other side of the valve xis, extends beyond the shoulder 37 and terminates in shoulder 39. An axial bore 40, extending beyond the houlders 37 and 39, is of reduced diameter and terminates in closely spaced relation to the top of the press utton. Intermediate the ends of the reduced bore and pposite that portion of the main bore extended beyond he shoulder 37, there is provided circumferentially exending grooves 41 and 42 located in spaced relation ngthwise or axially of the stem.

The free end 43 of the stem 31 is sized to rotatably t within the reduced axial bore 40. When assembled, his structure forms an expansion chamber 44 which in flow communication with the inner ends of the paced grooves 41 and 42, *which serve as passages for he flow of aerosol material.* It will be noted that the educed end 43 of the stem extends downwardly beyond he shoulder 37. As best shown in Figure 5, the side f the stem adjacent the base slot 32 has a flat surface 5 tangent to the outer periphery of the reduced end 3. A flow passageway 46 is thereby formed to extend etween and connect the slot 32 and the expansion chamer 44 for flow communication.

Figure 8:
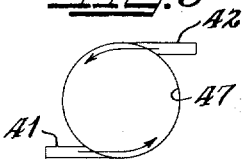

Another expansion chamber 47, *shown in Figs. 1 and 8 as substantially circular,* is located in that portion of the side wall of the press button forming the reduced axial bore 40 and opposite the portion 38 of the main bore terminating in the shoulder 39. This second expansion chamber is so positioned as to be in flow communication with the forward ends of the grooves 41 and 42. An ejection orifice 48 connects the expansion chamber 47 and an exterior spray opening 49 through which material is sprayed to the atmosphere.

Figure 7:
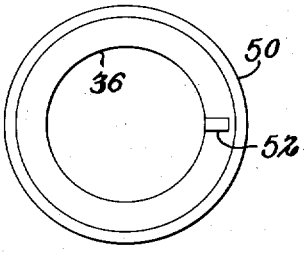
Figure 7 is a plan view of the bottom face of the press button showing a cleaning lug thereon; and, Figure 8 is a fragmentary vertical sectional view of the upper end of the button, taken substantially at right angles to the section illustrated in Figure 1.

The lower end of the press button 35 is shaped to provide a cylindrical portion 50 which is tightly embraced by the disc gasket 16 when the press button is applied to the valve stem and the valve is in an inoperative position. When the press button is manually depressed to actuate the valve body through the stem, an outwardly flared portion 51 of the valve body is actuated into the central opening of the disc gasket thereby effecting a tighter seal during the flow of aerosol material from the container through the valve. As best shown in Figures 1, 5 and 7, a cleaning lug 52 is formed on the lower end face of the press button and is so located as to be in alignment with the groove 34. Preferably, the lug is shaped to complementally engage the groove to clean the groove of any foreign or other matter lodged therein when the press button is rotated relative to the valve stem. It will be noted that the end of the button seats on the cup surface of the valve body and covers the groove 34.

The valve body and stem construction and the valve housing described herein may be formed of any suitable material but it is preferred that they be of a rigid molded plastic such as nylon. The press button is also formed of a molded plastic, preferably a resilient plastic such as polyethylene. The particular material used should have the properties of rigidity with sufficient resilience to permit rotation of the press button relative to the valve stem and with adjacent surfaces thereof fitted sufficiently close to engage with sealing effect.

Operation of the valve mechanism will now be described.

The valve mechanism of Figure 1 shows the relative position of the various parts in assembly and with the valve inoperative. To fill the container, the press button 35 is removed from the stem. A mechanism for filling the container is then applied around the valve stem and the aerosol material and propellant are injected under pressure. During injection, the coiled spring 28 collapses thereby permitting material to flow through the spaces between the valve stem and flexible disc, between the valve body and valve housing, between the ribs 24, 24, and directly into the container through the central channel 23 of the tubular portion 22. When the container is filled, a release of the filling pressure effects a sealing of the valve housing by the rim engagement of the valve body and gasket through pressure exerted by the coiled spring.

It will be noted that all of the flow passageways during the filling operation are relatively large thereby effecting a quick and easy filling of the container.

The press button 35 is then applied to the valve stem 31 in seated engagement therewith in which the lower end of the button abuts the bottom face of the cup of the valve body. The pressure required to snap the press button on the valve stem preferably should not overcome the compression of the coiled spring 28 and the internal pressure exerted by the contained aerosol mixture acting on the valve body to help maintain it in sealing engagement with the gasket. It is desired, however, that the press fit of the button on the valve stem provide sufficient friction therebetween to eliminate the possibility of inadvertent removal.

The valve mechanism is now ready for operation to eject the aerosol mixture. When the press button is manually depressed to break the rim engagement of the valve body and the gasket, the flow channel through the valve from the container to the atmosphere is opened to flow. The pressurized aerosol mixture then flows through the channel 23 into the interior of the valve housing 21, between ribs 24, 24 around the valve body, and into the cup portion thereof. The material in the cup portion then enters the slot 33, passes through the groove 34 and flow passageway 46, and into the mixing or expansion chamber 44. From the mixing or expansion chamber, the flow is through the spaced grooves 41 and 42, into the mixing or expansion chamber 47, and through the orifice 48 into the atmosphere.

In Figure 5 is shown the relation of parts when the press button and valve body are connected for operation. It is desirable that the narrower cleaning lug 52 be located centrally of the slot 33. In this position, fluid flow is to both sides of the cleaning lug through the groove 34 and into the vertical channel 46 extending between the stem and press button. However, if the cleaning lug is located at any point along the length of the groove 34 on either side of the stem, flow is effected to the slot 32 through the open portion of the groove on the other side of the stem. This cleaning feature is of particular importance where the aerosol mixture used is relatively viscous or is of a type which quickly solidifies. By rotating the press button relative to the stem one complete turn, the groove 34 is cleaned along its entire length.

In Figure 8 is diagrammatically shown the relationship of the grooves 41 and 42 with respect to the mixing or expansion chamber 47. The groove 41 has entry to the chamber at the bottom thereof while the groove 42 has entry at the top. The streams of material, entering the chamber through the grooves, rotate as shown by the arrows thereby effecting a more thorough mixing of the materials just prior to ejection into the atmosphere.

The provisions in a flow channel of a plurality of restricted orifices, such as the groove 34, the grooves 41 and 42, and the flow orifice 48, and of directing streams of material in a circular flow path as in the chamber 47, all aid in effecting a finer vaporization or atomization of the aerosol material than is possible to obtain in other dispensing valve mechanisms.

Although the invention has been described herein more or less precisely as to details, it is to be understood that the invention is not to be limited thereby, as changes may be made in the arrangement and proportion of parts, and equivalents may be substituted, without departing from the spirit and scope of the invention.

I claim as my invention:

1. A valve mechanism comprising a movable valve element, said element having a cup-shaped body and a stem extending therefrom, an actuator button rotatably embracing said stem, said stem and button having a passageway system extending from the cup of the valve element and through the button to the exterior thereof, one portion of said passageway system forming a groove in the valve body, another portion of the system forming spaced grooves extending circumferentially of the stem, and a lug on said button arranged for movement through one of said grooves during rotation of the button on the stem.

2. A valve mechanism comprising a movable valve element, said element having a body and a stem extending therefrom, an actuator button rotatably embracing said stem, said stem and button having a passageway system extending from the body and through the button to the exterior thereof, one portion of said passageway system forming a groove in the valve body, another portion of the system forming spaced grooves extending circumferentially of the stem, and a lug on said button arranged for movement through one of said grooves during rotation of the button on the stem.

3. A valve mechanism comprising a movable valve element, said element having a cup-shaped body and a stem extending therefrom, an actuator button rotatably embracing said stem, said stem and button having a passageway system extending from the cup of the valve element and through the button to the exterior thereof, one portion of said passageway system forming a groove in the cup body of the valve element concentric with the rotatable axis of the button, another portion of the system forming a plurality of spaced grooves extending circumferentially of the stem and terminating in a common passageway, and a lug on said button arranged for movement through said valve element groove during rotation of the button.

4. A valve mechanism comprising a cup-shaped valve body and an actuating stem extending therefrom, an actuator button arranged to rotatably embrace said stem, the stem and button having a flow passageway system therebetween extending from the body cup to the atmosphere, one portion of the passageway system forming a groove in the cup-shaped body concentric with the rotating axis of the button and being covered by the button when embracing the stem, another portion of the passageway system connecting the concentric groove and the cup of the body to flow therebetween, and a lug on said button shaped to complementally seat in and arranged to be moved through said concentric groove during rotation of the button.

5. A valve mechanism comprising a cup-shaped valve body and an actuating stem extending therefrom, an actuator button arranged to rotatably embrace said stem and seat against the cup of the valve body, the stem and button having a flow passageway system therebetween extending from the cup of the valve body along the stem and through the button to the atmosphere, one portion of the passageway system forming a groove in the cup-shaped body around and concentric to the rotating axis of the button and located under the seat of the button on the valve body, another portion of the passageway system forming slots in the valve body on opposite sides of the stem, said concentric groove connecting with one of the slots at an end thereof and connecting with the other of said slots intermediately of the ends thereof, and a lug on the seat of the button and shaped to complementally engage and arrange to be moved through said concentric groove during rotation of the button.

6. A valve mechanism comprising a cup-shaped valve body and an actuating stem extending therefrom, an actuator button arranged to rotatably embrace said stem and seat against the cup of the valve body, the stem and button having a flow passageway system therebetween extending from the cup of the valve body along the stem and through the button to the atmosphere, one portion of the passageway system forming a groove in the cup-shaped body around and concentric to the rotating axis of the button and located under the seat of the button on the valve body, another portion of the passageway system forming slots in the valve body on opposite sides of the stem, said concentric groove connecting with one of the slots at an end thereof and connecting with the other of said slots intermediately of the ends thereof, still another portion of the passageway system forming spaced grooves extending circumferentially of the stem and an expansion chamber in which the grooves terminate, and a lug on the seat of the button and shaped to complementally engage and arranged to be moved through said concentric groove during rotation of the button.

7. A valve mechanism comprising a valve body and an actuating stem extending therefrom, an actuator button rotatably mounted on said stem and seated against the valve body, the stem and button having a flow passageway system therebetween extending from the valve body along the stem and through the button to the atmosphere, one portion of the passageway system forming a groove in the body concentric to the rotating axis of the button and located under the seat of the button of the valve body, another portion of the passageway system forming slots in the valve body on opposite sides of the stem, said concentric groove connecting with one of the slots at an end thereof and connecting with the other of said slots intermediately of the ends thereof, still another portion of the passageway system forming spaced grooves extending circumferentially of the stem and an expansion chamber in which the grooves terminate, and a lug on the seat of the button shaped to complementally engage and arranged to be moved through said concentric groove during rotation of the button.

8. A valve mechanism comprising a valve body and an actuating stem extending therefrom, an actuator button rotatably mounted on said stem and seated against the valve body, the stem and button having a flow passageway system therebetween extending from the valve body along the stem and through the button to the atmosphere, one portion of the passageway system forming a groove in the body concentric to the rotating axis of the button and located under the seat of the button on the valve body, another portion of the passageway system forming at least one slot in the valve body, said concentric groove connecting with the slot, still another portion of the passageway system forming spaced grooves extending circumferentially of the stem and an expansion chamber in which the grooves terminate, and means on the button to be moved through said concentric groove during rotation of the button.

9. A valve mechanism comprising a valve body and an actuating stem extending therefrom, an actuator button arranged to rotatably embrace said stem, the stem and button having a flow passageway system therebetween extending from the valve body along the stem and through the button to the atmosphere, one portion of the passageway system forming a groove in the body around and concentric to the rotating axis of the button, still another portion of the passageway system forming spaced grooves extending circumferentially of the stem and an expansion chamber in which the grooves terminate, and a lug on the button shaped to complementally engage and arranged to be moved through said concentric groove during rotation of the button.

*10. An assembly of the character described comprising: a molded press button having a socket, a valve stem formed to provide a passage and received in said socket in peripheral sealing engagement with a substantial portion of the socket wall area, said button having an ejection orifice formed through its wall and opening into said area of peripheral sealing engagement to provide a discharge passage with a depression integrally formed in one wall of the socket in said sealing area forming a shallow substantially circular chamber surrounding the inner end of said ejection orifice, there being a fluid feed passage formed in the button communicating at one end with the passage of the valve stem and at its other end intersecting said circular chamber substantially tangentially of the latter.*

*11. An assembly according to claim 10, wherein the circular chamber is substantially coaxial with the ejection orifice.*

*12. In an assembly of the character described, a pressurized container having a valve with an upstanding valve stem formed to provide therein a discharge passage, a molded valve operating button provided in its bottom with a socket containing one end of the valve stem, said button also having formed therein an ejection orifice leading through one lateral side of the button from a substantially circular chamber integrally formed within the confines of the button laterally of and in one side of the socket wall with the axis of said chamber in angular relation to the axis of the socket, said button also having formed therein a passage leading from the passage in the valve stem to the circular chamber and merging therewith substantially tangentially thereof.*

*13. In an assembly of the character described, a pressurized container having a valve with an upstanding valve stem formed to provide therein a discharge passage, a molded valve operating button provided in its bottom with a socket containing one end of the valve stem, said button also having formed therein an ejection orifice leading through one lateral side of the button from a substantially circular chamber integrally formed within the confines of the button laterally of and in one side of the socket wall with the axis of said chamber in angular relation to the axis of the socket, said button also having formed therein grooves extending in opposite directions about the valve stem and leading from the passage in the valve stem to the opposite sides of the circular chamber and merging therewith substantially tangentially thereof.*

*14. A molded valve operating press button provided with a socket to receive the valve stem of a container of pressurized material, said button having therein an ejection orifice forming an integral part of the button and extending from the exterior of the button and merging interiorly of the button into a substantially circular expansion chamber also forming an integral part of the button and one side of which is open to the socket, said button also having integrally formed therein a passage leading from said socket to and merging into said expansion chamber substantially tangentially of the latter to direct effluent pressurized material entering the chamber in a circular path within said expansion chamber immediately before ejection of such material into the atmosphere.*

*15. A press button according to claim 14, wherein the ejection orifice is substantially coaxial with the circular expansion chamber.*

*16. A valve operating press button for the valve stem of a container of pressurized material, said button being an integral molding provided with a socket to receive and snugly fit the end of the valve stem to be operated by the button, there being integrally formed in the button a substantially circular expansion chamber one side of which is open to the interior of said socket and the axis of which is in angular relation to the axis of the socket, said button also having integrally formed therein a passage leading from the socket to and merging into said circular chamber substantially tangentially of the latter, and said button also having an ejection orifice leading from said chamber to the exterior of the button.*

*17. A valve operating press button provided with a socket to receive the valve stem of a container of pressurized material, said button having an ejection orifice forming an integral part of the button extending from the exterior of the button and merging interiorly of the button into a sustantially circular expansion chamber also forming an integral part of the button and one side of which is open to the socket, said button having integrally formed therein grooves leading from the socket and extending in opposite directions about the socket to the circular chamber and merging therewith substantially tangentially thereof to collectively direct the effluent pressurized material entering the chamber in a circular path within said expansion chamber immediately before ejection of such material into the atmosphere.*

References Cited in the file of this patent or the original patent

UNITED STATES PATENTS

| | | |
|---|---|---|
| 2,213,846 | Meyer | Sept. 3, 1940 |
| 2,362,080 | Martin | Nov. 7, 1944 |
| 2,686,652 | Carlson et al. | Aug. 17, 1954 |
| 2,693,983 | Howell | Nov. 9, 1954 |
| 2,702,957 | Cooprider et al. | Mar. 1, 1955 |
| 2,734,773 | Ivins | Feb. 14, 1956 |